United States Patent
Vatis et al.

(10) Patent No.: US 12,440,064 B1
(45) Date of Patent: Oct. 14, 2025

(54) MULTI-PLY COOKWARE WITH CARBON STEEL COOKING SURFACE LAYER

(71) Applicant: Gizmatic LLC, Oxon Hill, MD (US)

(72) Inventors: William Vatis, Alexandria, VA (US); Katie Kearns, Alexandria, VA (US)

(73) Assignee: Gizmatic LLC, Oxon Hill, MD (US)

( * ) Notice: Subject to any disclaimer, the term of this patent is extended or adjusted under 35 U.S.C. 154(b) by 0 days.

(21) Appl. No.: 19/188,067

(22) Filed: Apr. 24, 2025

Related U.S. Application Data

(63) Continuation of application No. 18/894,057, filed on Sep. 24, 2024.

(51) Int. Cl.
| | |
|---|---|
| A47J 37/10 | (2006.01) |
| A47J 27/00 | (2006.01) |
| A47J 36/02 | (2006.01) |
| B32B 15/01 | (2006.01) |

(52) U.S. Cl.
CPC .......... *A47J 37/10* (2013.01); *A47J 27/002* (2013.01); *A47J 36/02* (2013.01); *B32B 15/012* (2013.01)

(58) Field of Classification Search
None
See application file for complete search history.

(56) References Cited

U.S. PATENT DOCUMENTS

| | | | | |
|---|---|---|---|---|
| 2002/0040905 A1* | 4/2002 | Groll | ...... | B05D 3/007 264/28 |
| 2006/0042623 A1* | 3/2006 | Cheng | ...... | A47J 27/002 126/373.1 |
| 2007/0000915 A1* | 1/2007 | Cheng | ...... | A47J 27/002 219/621 |
| 2010/0108690 A1* | 5/2010 | Groll | ...... | A47J 36/02 220/573.1 |
| 2015/0108143 A1* | 4/2015 | Groll | ...... | A47J 27/002 220/573.2 |

FOREIGN PATENT DOCUMENTS

| | | | | |
|---|---|---|---|---|
| CN | 112806820 A | * | 5/2021 | ...... A47J 27/00 |
| IT | 202100004745 A1 | * | 9/2022 | ...... A47J 36/02 |
| KR | 101118754 B1 | * | 3/2012 | ...... C22C 38/00 |
| WO | WO-2013093297 A1 | * | 6/2013 | ...... A47J 36/02 |

OTHER PUBLICATIONS

DC04, Salzgitter Flachstahl, Apr. 2014 (Year: 2014).*

(Continued)

*Primary Examiner* — John J Norton
(74) *Attorney, Agent, or Firm* — Bradley Arant Boult Cummings LLP

(57) ABSTRACT

Multi-ply cookware that is durable and corrosion resistant while also providing better heat distribution and a seasonable cooking surface is disclosed. The multi-ply cookware may include a body and a handle secured to the body. The body may include a cooking surface layer, one or more thermal layers disposed below the cooking surface layer, and a protective layer disposed below the thermal layers. The cooking surface layer may be composed of carbon steel. The thermal layer may be composed of aluminum. The protective layer may be formed of stainless steel. The cooking surface layer, the thermal layers, and the protective layer may be laminated together.

21 Claims, 4 Drawing Sheets

(56) References Cited

OTHER PUBLICATIONS

CN 112806820 A (Wu, Hui-min et al.) May 18, 2021 [retrieved on May 31, 2025]. Retrieved from Foreign Image and Text database, translation by Clarivate Analytics. (Year: 2021).*
IT 202100004745 A1 (Bertozzini, Giuseppe Alberto) Sep. 1, 2022 [retrieved on May 31, 2025]. Retrieved from Foreign Image and Text database, translation by Clarivate Analytics. (Year: 2022).*
WO 2013/093297 A1 (Allemand, Simon et al.) Jun. 27, 2013 [retrieved on May 31, 2025]. Retrieved from Foreign Image and Text database, translation by Clarivate Analytics. (Year: 2013).*
KR 10-1118745 B1 (Choi, Dong-Ho) Mar. 9, 2012 [retrieved on May 31, 2025]. Retrieved from Foreign Image and Text database, translation by Clarivate Analytics. (Year: 2012).*
Strata | Carbon Steel Clad Pan, Wayback Machine dated to Jan. 16, 2024 [retrieved on Jul. 1, 2025]. Retrieved from the Internet <URL: https://web.archive.org/web/20240116235306/https://www.stratacookware.com/> (Year: 2024).*
The Misen Carbon Nonstick Pan [retrieved on Jul. 1, 2025]. Retrieved from the Internet <URL: https://www.kickstarter.com/projects/misenkitchen/the-misen-carbon-nonstick-pan/creator> (Year: 2025).*

* cited by examiner

MULTI-PLY COOKWARE WITH CARBON STEEL COOKING SURFACE LAYER

CROSS-REFERENCE TO RELATED APPLICATIONS

This application is a continuation of U.S. application Ser. No. 18/894,057, filed on Sep. 24, 2024, the entire disclosure of which is incorporated by reference herein.

TECHNICAL FIELD

The present disclosure relates generally to cookware, and more particularly to multi-ply cookware with a carbon steel top layer.

BACKGROUND

Cookware, such as pots, pans, and other dishes used for cooking food, are commonly formed using a single-ply or multi-ply construction. Single-ply construction refers to cookware that is made from a single layer of material. Multi-ply cookware, which may also be referred to as laminated cookware, consists of several layers (or "plies") of different materials. Single-ply cookware is typically lighter and less expensive, but it might not heat as evenly or retain heat as well as multi-ply cookware. Multi-ply cookware may combine materials like stainless steel, aluminum, and copper, to optimize heat conduction and retention while maintaining durability. For instance, a tri-ply pan might have an aluminum core disposed between layers of stainless steel to increase thermal conductivity as aluminum is known to be more thermally conductive than stainless steel.

The materials used to construct single-ply and multi-ply cookware have a significant effect on the cooking performance of the cookware. While carbon steel cookware has excellent heat retention and nonstick properties after seasoning, carbon steel cookware requires maintenance to prevent rust and can suffer from uneven heat distribution, which can cook food unevenly and lead to internal stresses that result in warping. High-quality carbon steel cookware is usually single-ply and made with a relatively thick layer of carbon steel, typically about 2.0 mm to about 5.0 mm thick, to increase strength and reduce the risk of warping. This thickness, however, results in cookware that is very heavy and difficult to handle. Stainless steel pans, specifically those with aluminum cores, provide better heat distribution but lack the superior nonstick properties of carbon steel after seasoning.

Accordingly, there remains a need in the art for multi-ply cookware that is durable and corrosion resistant while also providing better heat distribution and a seasonable cooking surface.

SUMMARY

The problems expounded above, as well as others, are addressed by the following inventions, although it is to be understood that not every embodiment of the inventions described herein will address each of the problems described above.

In one aspect, the present disclosure provides multi-ply cookware that is durable and corrosion resistant while also providing better heat distribution and a seasonable cooking surface. In some embodiments, the multi-ply cookware includes a body having a cooking surface layer formed from carbon steel and at least one thermal layer disposed below the cooking surface layer, and a handle connected to the body.

In some embodiments, the carbon steel of the cooking surface layer has a carbon content of about 0.05% to about 2.0% carbon by weight. In further embodiments, the carbon steel of the cooking surface layer has a carbon content of about 0.05% to about 0.1% carbon by weight. In yet further embodiments, the cooking surface layer has a thickness of about 0.1 mm to about 3.0 mm. In still further embodiments, the cooking surface layer has a thickness, $T_{CSL}$, and the carbon steel of the cooking surface layer has a carbon content, $CC_{CSL}$, and wherein $$0.03 \leq \frac{T_{CSL}}{3 - CC_{CSL}} \leq 1.05$$

In further embodiments, the at least one thermal layer is formed from aluminum. In yet further embodiments, the multi-ply cookware includes a second thermal layer formed from a material that is less thermally conductive than the at least one thermal layer formed from aluminum. In still further embodiments, the at least one thermal layer has a thickness of about 0.5 mm to about 5.0 mm. In further embodiments, the body further includes a protective layer disposed below the at least one thermal layer. In still further embodiments, the protective layer has a thickness of about 0.1 mm to about 3.0 mm. In yet further embodiments, the protective layer is formed from stainless steel.

In other embodiments, the multi-ply cookware includes a body having a cooking surface layer formed from carbon steel having a carbon content of about 0.05% to about 2.0% carbon by weight, wherein the cooking surface layer has a thickness of about 0.1 mm to about 3.0 mm and forms an interior surface of the body; a thermal layer formed from aluminum and having a thickness of about 0.5 to about 5.0 mm, wherein the thermal layer is disposed below the cooking surface layer; and a protective layer formed from stainless steel and having a thickness of about 0.1 mm to about 3.0 mm, wherein the protective layer is disposed below the thermal layer and forms an exterior surface of the body, and wherein the cooking surface layer, the thermal layer, and the protective layer are laminated together.

In some embodiments, the carbon steel of the cooking surface layer has a carbon content of about 0.05% to about 0.1% carbon by weight. In further embodiments, the protective layer is formed from magnetic stainless steel. In still further embodiments, the cooking surface layer is seasonable. In yet further embodiments, the body is fully clad.

In another aspect, the present disclosure provides a method of manufacturing multi-ply cookware including a cooking surface layer and a thermal layer. In some embodiments, the method of manufacturing multi-ply cookware includes the steps of providing a carbon steel sheet and a thermally conductive metal sheet, wherein the carbon steel sheet has a carbon content of about 0.05% to about 2.0% carbon by weight; laminating the carbon steel sheet and the thermally conductive metal sheet together to form a laminated sheet; forming the laminated sheet into a predetermined cookware shape, wherein the carbon steel sheet forms a cooking surface layer and the thermally conductive metal sheet forms a thermal layer disposed under the cooking surface layer; polishing the cooking surface layer; heating the cooking surface layer; and oiling the cooking surface layer.

In some embodiments of the method of manufacturing multi-ply cookware, the step of laminating, the step of polishing, and the step of oiling are performed within about sixty minutes. In further embodiments, the method of manufacturing multi-ply cookware further includes the step of providing a stainless steel sheet and laminating the carbon steel sheet, the thermally conductive metal sheet, and the stainless steel sheet together to form the laminated sheet, and wherein after the step of forming the laminated sheet into a predetermined cookware shape, the stainless steel sheet forms a protective layer of the multi-ply cookware. In yet another embodiment of the method of manufacturing multi-ply cookware, after the step of forming the laminated sheet into a predetermined cookware shape, the cooking surface layer has a thickness of about 0.1 mm to about 3.0 mm, the thermal layer has a thickness of about 0.5 mm to about 5.0 mm, and the protective layer has a thickness of about 0.1 mm to about 3.0 mm. In still another embodiment, the method of manufacturing multi-ply cookware includes the step of heating the cooking surface layer to a temperature of about 65° C. to about 75° C.

BRIEF DESCRIPTION OF THE DRAWINGS

Further features and advantages can be ascertained from the following detailed description that is provided in connection with the drawings described below.

DETAILED DESCRIPTION

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural (i.e., "at least one") forms as well, unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Spatially relative terms, such as "above," "under," "below," "lower," "over," "upper," and the like, may be used herein for ease of description to describe one element or feature's relationship to another when the apparatus is right side up as shown in the accompanying drawings.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

Figure 1:
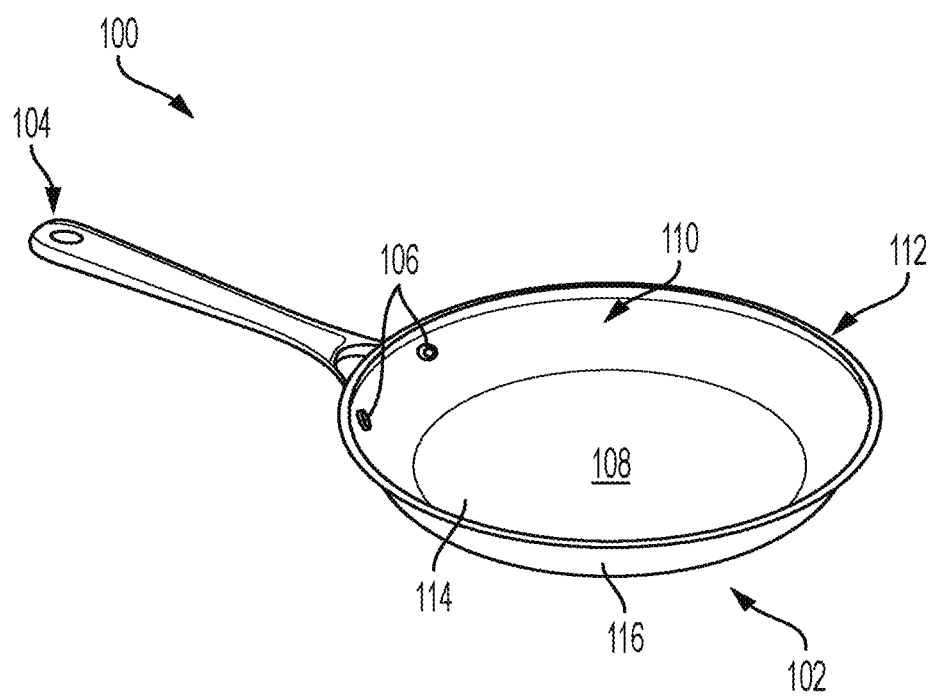
FIG. 1 is a top perspective view of multi-ply cookware according to one embodiment of the present disclosure.

Referring to FIG. 1, multi-ply cookware 100 according to an embodiment of the present disclosure is shown. In FIG. 1, the multi-ply cookware 100 is a frying pan. However, it shall be understood that the multi-ply cookware 100 of the present disclosure may be in the form of any type of cookware including, but not limited to, sauce pans, sauté pans, frying pans, stockpots, Dutch ovens, casserole dishes, braising pans, grill pans, woks, roasting pans, double boilers, pressure cookers, steamers, griddles, crepe pans, paella pans, tagines, omelet pans, bread pans, and ramekins of various sizes and dimensions. The multi-ply cookware 100 of the present disclosure may be durable and corrosion resistant while also providing a seasonable cooking surface and better heat distribution than other cookware.

As illustrated in FIG. 1, the multi-ply cookware 100 may include a body 102 and a handle 104. In the embodiment of FIG. 1, the handle 104 may be secured to the body 102 via rivets 106. In other embodiments, the handle 104 may be integrally formed with the body 102 or the handle 104 may be secured to the body 102 using bolts or screws, adhesives, or welding. The handle 104 may be formed from any type of strong and durable material, such as wood, cast iron, aluminum, stainless steel, and composites. For example, in one embodiment, the handle 104 is formed from stainless steel. In another embodiment, the handle 104 is formed from hollow cast stainless steel.

The body 102 of the multi-ply cookware 100 may include a base 108, a sidewall 110 extending upward from and around the base 108, and a rim 112 disposed around the top of the sidewall 110. The body 102 of the multi-ply cookware 100 may also include an interior surface 114 and an exterior surface 116 opposite the interior surface 114. The interior surface 114 and exterior surface 116 may extend across the base 108 and sidewall 110. The interior surface 114 may be the cooking surface or food contact surface. Generally, the exterior surface 116 is the surface contacting or facing the heating element of the cooking appliance being used. However, depending on the cooking method employed, a different heating element, such as a broiler or oven, may be used, and the exterior surface 116 may contact or rest on a rack or other support surface. The multi-ply cookware 100 may include other components not shown such as lids, spouts, knobs, helper handles, nonstick coatings, interior graduation marks, etc.

The body 102 of the multi-ply cookware 100 may be constructed from two or more layers or plies. For example, the body 102 of the multi-ply cookware 100 may be constructed from three, four, five, six, or even seven or more plies. The body 102 of the multi-ply cookware 100 includes a cooking surface layer 118 that is seasonable to enhance the non-stick properties of the multi-ply cookware 100 and one or more thermal layers 120 disposed below the cooking surface layer 118. In some embodiments having three or more plies, the body 102 of the multi-ply cookware 100 may include a durable and corrosion-resistant protective layer disposed below the one or more thermal layers 120. In the embodiments shown in FIGS. 1-3, the body 102 of the multi-ply cookware 100 is constructed from three layers including a cooking surface layer 118, a thermal layer 120, and a protective layer 122. Each of these layers is discussed in more detail below.

The cooking surface layer 118 is the top layer of the multi-ply cookware 100 and forms the interior surface 114 of the pan. The cooking surface layer 118 may be formed from a material that is durable, has a high heat capacity to retain heat, and has natural non-stick properties when properly seasoned. In some embodiments, the cooking surface layer 118 may be formed from carbon steel. Carbon steel is composed primarily of iron and carbon and has several properties that make it ideal for cooking. It heats up quickly and evenly to allow for excellent control over cooking temperatures and can withstand high heat, which makes it ideal for searing, browning, and frying. Carbon steel can also be readily seasoned. Seasoning is the process of polymerizing layers of oil or fat on the cooking surface of the cookware by applying a layer of fat or oil to the surface and heating the fat or oil until it forms a hard, low-stick layer. Other materials like stainless steel cannot be readily seasoned as the polymerized oils and fats formed by seasoning do not adhere well to stainless steel, which reduces the lifespan of any seasoning layer formed and makes seasoning stainless steel impractical and less useful.

Moreover, carbon steel is durable, resistant to warping, and more ductile than other cookware materials. Generally, carbon steel with lower carbon content are more ductile than carbon steel with higher carbon content. The durability and ductility of carbon steel is influenced by the carbon content of the carbon steel. The carbon content of carbon steel can range from about 0.05% to about 2.1% carbon by weight. Carbon steel is generally classified into low carbon steel containing about 0.05% to about 0.30% carbon by weight; medium carbon steel containing about 0.31% to about 0.60% carbon by weight; high carbon steel containing about 0.61% to about 1.5% carbon by weight; and ultra-high carbon steel containing about 1.5% to about 2.1% carbon by weight. Carbon steel used in the cooking surface layer 118 of the multi-ply cookware 100 of the present disclosure may be low carbon steel, medium carbon steel, high carbon steel, or ultra-high carbon steel. In one embodiment, the carbon steel used in the cooking surface layer 118 is low carbon steel. In another embodiment, the carbon steel used in the cooking surface layer 118 is medium carbon steel. The compositions and properties of low, medium, and high carbon steel are described in Table 1 below.

In some embodiments, the carbon content of carbon steel used in the cooking surface layer 118 may be about 0.05% to about 2.1%. In further embodiments, the carbon content of carbon steel used in the cooking surface layer 118 may be about 0.05% to about 1.5% or about 0.05% to about 0.6% or about 0.05% to about 0.5% or about 0.05% to about 0.4% or about 0.05% to about 0.3% or about 0.05% to about 0.2% or about 0.05% to about 0.1% or about 0.05% to about 0.15% or about 0.1% to about 0.15% or about 0.1% to about 0.2% or about 0.1% to about 0.3% or about 0.1% to about 0.5% carbon by weight. In further embodiments, the carbon content of carbon steel used in the cooking surface layer 118 may be about 0.2% to about 2.1% or about 0.2% to about 1.5% or about 0.6% to about 2.1% or about 0.4% to about 1.8% or about 0.2% to about 1.0% or about 0.5% to about 1.5% or about 1.0% to about 2.1% or about 0.2% to about 0.6% or about 0.4% to about 0.8% or about 0.6% to about 1.0% or about 0.8% to about 1.2% or about 1.0% to about 1.5% or about 1.5% to about 2.1% carbon by weight. As an example, the carbon content of carbon steel used in the cooking surface layer 118 may be about 0.05% to about 0.1%.

The cooking surface layer 118 may have a thickness extending from the interior surface 114 of the body 102 to the adjacent thermal layer 120 of the body 102. The thickness of the cooking surface layer 118 may be consistent or may vary across the cooking surface layer 118. The thickness of the cooking surface layer 118 may be in the range of about 0.05 mm to about 3.0 mm. In some embodiments, the thickness of the cooking surface layer 118 may be about 0.05 mm to about 2.5 mm or about 0.05 mm to about 2.0 mm or about 0.05 mm to about 1.5 mm or about 0.05 mm to about 1.0 mm or about 0.05 mm to about 0.4 mm. In further embodiments, the thickness of the cooking surface layer 118 may be about 0.1 mm to about 3.0 mm or about 0.1 mm to about 2.0 mm. In another embodiment, the thickness of the cooking surface layer 118 may be about 0.2 mm to about 1.8 mm. In still another embodiment, the thickness of the cooking surface layer 118 may be about 0.3 mm to about 1.5 mm. In another embodiment, the thickness of the cooking surface layer 118 may be about 0.4 mm to about 1.0 mm.

In further embodiments, the thickness of the cooking surface layer 118 may be about 0.05 mm to about 0.6 mm. In another embodiment, the thickness of the cooking surface layer 118 may be about 0.2 mm to about 0.5 mm. In yet another embodiment, the thickness of the cooking surface layer 118 may be about 0.3 mm to about 0.4 mm. For instance, the thickness of the cooking surface layer 118 may be about 0.35 mm to about 0.45 mm.

In some embodiments, the thickness of the cooking surface layer 118 may be determined based on the carbon content of the carbon steel used to form the cooking surface layer 118. In one embodiment, the thickness of the cooking

TABLE 1

Properties of Low, Medium, and High Carbon Steel

|  | Carbon Steel Type | Low | Medium | High |
|---|---|---|---|---|
| Property | Density (lb/in$^3$) | 0.103-0.292 | 0.280-0.285 | 0.0163-0.298 |
|  | Tensile Strength, Yield (psi) | 20,300-347,000 | 35,500-252,000 | 39,900-484,000 |
|  | Fracture Toughness (ksi-in$^{1/2}$) | 30.0-105 | 73.7-130 | 12.0-150 |
|  | Shear Modulus (ksi) | 10,200-11,600 | 10,400-11,900 | 11,300-12,000 |
|  | Melting Point (° F.) | 2,600 | 2,600-2800 | 2,800-2,900 |
|  | Thermal Conductivity (BTU-in/hr-ft$^2$-° F.) | 176-645 | 152-361 | 132-361 | surface layer 118 is related to the carbon content of the cooking surface layer 118, according to the relationship shown in Equation I below:

$$0.015 \le \frac{T_{CSL}}{3 - CC_{CSL}} \le 1.05, \qquad (I)$$

where $T_{CSL}$ represents the thickness of the cooking surface layer 118 in millimeters and $CC_{CSL}$ represents the carbon content of the carbon steel used to form the cooking surface layer 118 in parts by weight carbon per part weight of the carbon steel. For example, if the carbon content of the carbon steel used in the cooking surface layer 118 is 0.1%, the thickness of the cooking surface layer 118 may range from about 0.05 mm to about 3.0 mm. In another embodiment, the thickness of the cooking surface layer 118 is related to the carbon content of the cooking surface layer 118, according to the relationship shown in Equation II below:

$$0.03 \le \frac{T_{CSL}}{3 - CC_{CSL}} \le 1.05. \qquad (II)$$

In yet another embodiment, the thickness of the cooking surface layer 118 is related to the carbon content of the cooking surface layer 118, according to the relationship shown in Equation III below:

$$0.03 \le \frac{T_{CSL}}{3 - CC_{CSL}} \le 0.67. \qquad (III)$$

In still another embodiment, the thickness of the cooking surface layer 118 is related to the carbon content of the cooking surface layer 118, according to the relationship shown in Equation IV below:

$$0.03 \le \frac{T_{CSL}}{3 - CC_{CSL}} \le 0.34. \qquad (IV)$$

In still another embodiment, the thickness of the cooking surface layer 118 is related to the carbon content of the cooking surface layer 118, according to the relationship shown in Equation V below:

$$0.03 \le \frac{T_{CSL}}{3 - CC_{CSL}} \le 0.167. \qquad (V)$$

The one or more thermal layers 120 are the layers below the cooking surface layer 118 of the multi-ply cookware 100. When the multi-ply cookware 100 does not include a protective layer 122, the bottommost of the one or more thermal layers 120 may form the bottom layer of the multi-ply cookware 100. When the multi-ply cookware 100 does include a protective layer 122, the one or more thermal layers 120 may be considered to be or referred to as core layers of the multi-ply cookware 100. The thermal layers 120 are configured to modify the thermal performance of the multi-ply cookware 100. Particularly, the one or more thermal layers 120 may conduct heat from the heat source or, if present, the protective layer 122 to the cooking surface layer 118 and distribute heat across the cooking surface layer 118 to eliminate hot spots. The thermal layer(s) may be constructed from materials having high thermal conductivity including but not limited to aluminum, copper, graphite, carbon fiber, and aluminum nitride. In some embodiments, one or more of the thermal layer(s) may also be formed from materials having lower thermal conductivity than aluminum or copper including but not limited to stainless steel and carbon steel. In one embodiment, the one or more thermal layers may include a layer of low thermal conductivity material positioned between two layers of high thermal conductivity material. For instance, the one or more thermal layers may include a layer of stainless steel or carbon steel in between layers of aluminum. Types of materials that may be used in the thermal layer(s) are discussed in more detail below.

One or more of the thermal layer(s) may be formed from aluminum. Aluminum is generally an excellent conductor of heat and is lightweight, which makes it useful to include in the thermal layer(s) of multi-ply cookware 100. Examples of types of aluminum suitable for use in one or more thermal layers 120 include but are not limited to 1000 series aluminum, such as 1050 aluminum (about 99.5% percent aluminum by weight) and 1100 aluminum (about 99.9% aluminum by weight); 2000 series aluminum alloys, which include copper to increase strength; 3000 series aluminum alloys, such as 3003 aluminum, which includes manganese to increase strength; 5000 series aluminum, such as 5052 aluminum, which includes magnesium to increase strength and corrosion resistance; and 6000 series aluminum, such as 6061 aluminum, which includes magnesium and silicon to improve strength, corrosion resistance, and machinability. When two or more of the thermal layers 120 are formed from aluminum, the types of aluminum used in such thermal layers 120 may be the same type of aluminum or may be different types of aluminum.

One or more of the thermal layer(s) may be formed from copper. Copper is a superior heat conductor when compared to aluminum but is also more expensive and heavier than aluminum. Examples of types of copper suitable for use in one or more thermal layers 120 include but are not limited to pure or substantially pure copper such as C11000 copper or electrolytic tough pitch copper. Copper alloys may also be used. Examples of copper alloys that may be used include copper-zinc alloys, copper-tin alloys, and copper-nickel alloys. Copper alloys may be particularly beneficial when the multi-ply cookware 100 does not include a protective layer 122 as copper alloys are generally stronger and more corrosion resistant as compared to pure or substantially pure copper. When two or more of the thermal layers 120 are formed from copper, the types of copper used in such thermal layers 120 may be the same type of copper or may be different types of copper.

Other materials suitable for use in the one or more thermal layers 120 include stainless steel, graphite, carbon fiber, aluminum nitride, and carbon steel. Examples of types of stainless steels suitable for use in one or more thermal layers 120 include, but are not limited to 201 stainless steel, 304 stainless steel (18% chromium/10% nickel or 18% chromium/8% nickel), 316 stainless steel, 430 stainless steel, or 439 stainless steel. In some embodiments, a magnetic stainless steel, such as 430 stainless steel, may be desirable to make the multi-ply cookware 100 compatible with induction stoves. Examples of graphite and graphite-related compounds suitable for use in the thermal layers 120 include natural graphite, synthetic graphite, expanded graphite, and graphene. Examples of types of carbon fiber suitable for use in the present disclosure include but are not limited to standard modulus, intermediate modulus, high modulus, and ultra-high modulus carbon fiber; high strength and ultra-high strength carbon fiber; polyacrylonitrile-based, pitch-based, or rayon-based carbon fiber; or plain weave, twill weave, satin weave, or unidirectional carbon fiber. Examples of types of aluminum nitride suitable for use in the present disclosure include but are not limited to powdered aluminum nitride such as high-purity aluminum nitride powder or doped aluminum nitride powder; sintered aluminum nitride such as dense sintered aluminum nitride or pressureless sintered aluminum nitride; hot-pressed aluminum nitride; aluminum nitride ceramics such as aluminum nitride ceramic substrates or aluminum nitride ceramic films; aluminum nitride single crystals such as bulk aluminum nitride crystals or thin-film aluminum nitride crystals; aluminum nitride composites; and nanostructured aluminum nitride including aluminum nitride nanoparticles and aluminum nitride nanotubes and nanowires. Examples of types of carbon steel suitable for use in the present disclosure include but are not limited to low carbon steel, medium carbon steel, high carbon steel, or ultra-high carbon steel.

Each of the one or more thermal layers 120 may have a thickness. In embodiments including only one thermal layer, the thickness of the thermal layer 120 extends from the bottom of the cooking surface layer 118 to the exterior surface 116 of the pan or top surface of the protective layer 122, if present. In embodiments including two or more thermal layers 120, the thickness of a given thermal layer 120 may extend from the bottom of the cooking surface layer 118 of the body 102 or the adjacent upper thermal layer 120 to the top of the adjacent lower thermal layer, the top of the protective layer 122, if present, or, if no protective layer 122 is present, the exterior surface 116. The thickness of each of the one or more thermal layers 120 may be consistent or may vary across the one or more thermal layers 120. When multiple thermal layers 120 are used, the thickness of each thermal layer 120 may be substantially the same or different.

The thickness of an individual thermal layer 120 may be in the range of about 0.5 mm to about 5.0 mm. In some embodiments, the thickness of an individual thermal layer 120 may be about 0.5 mm to about 4.5 mm or about 0.5 mm to about 4.0 mm or about 0.5 mm to about 3.5 mm. In further embodiments, the thickness of an individual thermal layer 120 may be about 0.5 mm to about 3.0 mm. In another embodiment, the thickness of an individual thermal layer 120 may be about 1.0 mm to about 3.0 mm. In still another embodiment, the thickness of an individual thermal layer 120 may be about 1.5 mm to about 3.0 mm. In another embodiment, the thickness of an individual thermal layer 120 may be about 1.0 mm to about 2.5 mm.

In further embodiments, the thickness of an individual thermal layer 120 may be about 1.5 mm to about 2.5 mm. In another embodiment, the thickness of an individual thermal layer 120 may be about 1.6 mm to about 2.4 mm. In yet another embodiment, the thickness of an individual thermal layer 120 may be about 1.75 mm to about 2.25 mm. For instance, the thickness of an individual thermal layer 120 may be about 1.9 mm to about 2.1 mm.

The one or more thermal layers 120 may together have a total thermal layer 120 thickness. The total thickness of the one or more thermal layers 120 may extend from the bottom of the cooking surface layer 118 to the exterior surface 116 of the pan or top surface of the protective layer 122 if present. The total thickness of the one or more thermal layers 120 may be consistent or may vary across the one or more thermal layers 120. The total thickness of the one or more thermal layers 120 may be in the range of about 0.5 mm to about 5.0 mm. In some embodiments, the total thickness of the one or more thermal layers 120 may be about 0.5 mm to about 4.5 mm or about 0.5 mm to about 4.0 mm or about 0.5 mm to about 3.5 mm. In further embodiments, the total thickness of the one or more thermal layers 120 may be about 0.5 mm to about 3.0 mm. In another embodiment, the total thickness of the one or more thermal layers 120 may be about 1.0 mm to about 3.0 mm. In still another embodiment, the total thickness of the one or more thermal layers 120 may be about 1.5 mm to about 3.0 mm. In another embodiment, the total thickness of the one or more thermal layers 120 may be about 1.0 mm to about 2.5 mm.

When the multi-ply cookware 100 includes a protective layer 122, the protective layer 122 is the bottom layer of the multi-ply cookware 100 and forms the exterior surface 116 of the pan. The protective layer 122 may be formed from a durable and corrosion-resistant material to provide the multi-ply cookware 100 with additional structural integrity and to protect it from external damage and corrosion. The protective layer 122 may also be formed from a magnetic material or other induction-compatible material to improve the performance of the multi-ply cookware 100 on induction stovetops. Examples of materials suitable for use in the protective layer 122 include but are not limited to stainless steel, magnetic stainless steel, carbon steel, copper, aluminum, anodized aluminum, titanium, or alloys formed therewith. Examples of types of stainless steels suitable for use in the protective layer 122 include but are not limited to 201 stainless steel, 304 stainless steel (18% chromium/10% nickel or 18% chromium/8% nickel), 316 stainless steel, 430 stainless steel, or 439 stainless steel. 430 stainless steel may be used, for example, to produce an induction-compatible, durable protective layer 122 as 430 stainless steel has magnetic and martensitic properties. Examples of types of aluminum and copper suitable for use in the protective layer 122 include but are not limited to types of aluminum and copper suitable for use in the one or more thermal layers 120 as described elsewhere herein.

The protective layer 122 may have a thickness extending from the exterior surface 116 of the body 102 to the bottom of the one or more thermal layers 120. The thickness of the protective layer 122 may be consistent or may vary across the protective layer 122. The thickness of the protective layer 122 may be in the range of about 0.05 mm to about 3.0 mm. In some embodiments, the thickness of the protective layer 122 may be about 0.05 mm to about 2.5 mm or about 0.05 mm to about 2.0 mm or about 0.05 mm to about 1.5 mm or about 0.05 mm to about 1.0 mm or about 0.05 mm to about 0.4 mm. In further embodiments, the thickness of the protective layer 122 may be about 0.1 mm to about 3.0 mm or about 0.1 mm to about 2.0 mm. In another embodiment, the thickness of the protective layer 122 may be about 0.2 mm to about 1.8 mm. In still another embodiment, the thickness of the protective layer 122 may be about 0.3 mm to about 1.5 mm. In another embodiment, the thickness of the protective layer 122 may be about 0.4 mm to about 1.0 mm.

In further embodiments, the thickness of the protective layer 122 may be about 0.05 mm to about 0.6 mm. In another embodiment, the thickness of the protective layer 122 may be about 0.2 mm to about 0.5 mm. In yet another embodiment, the thickness of the protective layer 122 may be about 0.3 mm to about 0.4 mm. For instance, the thickness of the protective layer 122 may be about 0.35 mm to about 0.45 mm.

In some embodiments, the body 102 of the multi-ply cookware 100 of the present disclosure may be fully clad. As used herein, "fully clad" means that each of the cooking surface layer 118, one or more thermal layers 120, and, if present, the protective layer 122, extend across the body 102 of the multi-ply cookware 100 including through the base 108, sidewall 110, and rim 112 of the body 102. Fully clad cookware generally provides more even heat distribution across the interior surface 114 of the multi-ply cookware 100. In other embodiments, the body 102 of the multi-ply cookware 100 may be partially clad. As used herein, "partially clad" or "disc-bottom" cookware means that one or more of the protective layer 122 and thermal layer(s) 120 only extend across the base 108 of the body 102 and not across the sidewall 110 or rim 112 of the body 102 of the multi-ply cookware 100. Partially clad cookware provides even heat distribution through the base 108 of the multi-ply cookware 100 but not across the sidewall 110 or rim 112. Partially clad cookware is generally lighter and less expensive than fully clad cookware.

In some embodiments, the multi-ply cookware 100 is partially clad with respect to both the protective layer 122 and the thermal layer(s) 120. In such embodiments, the thermal layer(s) 120 may be encapsulated between the cooking surface layer 118 and the protective layer 122, and the cooking surface layer 118 may form the exterior surface 116 of the body 102 across the sidewall 110 and rim 112. In other embodiments, the multi-ply cookware 100 may only be partially clad with respect to the protective layer 122 such that the protective layer 122 extends across the base 108 of the body 102 but the thermal layer(s) 120 extend across the body 102 including the base 108, sidewall 110 and rim 112. In such embodiments, a thermal layer 120 may form the exterior surface 116 of the body 102 across the sidewall 110 and rim 112. In further embodiments, the multi-ply cookware 100 may only be partially clad with respect to the thermal layer(s) such that the thermal layers 120 only extend across the base 108 of the body 102 but the protective layer 122 extends across the body 102 including the base 108, sidewall 110, and rim 112. In embodiments including two or more thermal layers 120, some thermal layers 120 may be partially clad while other thermal layers 120 are fully clad.

Figure 4:
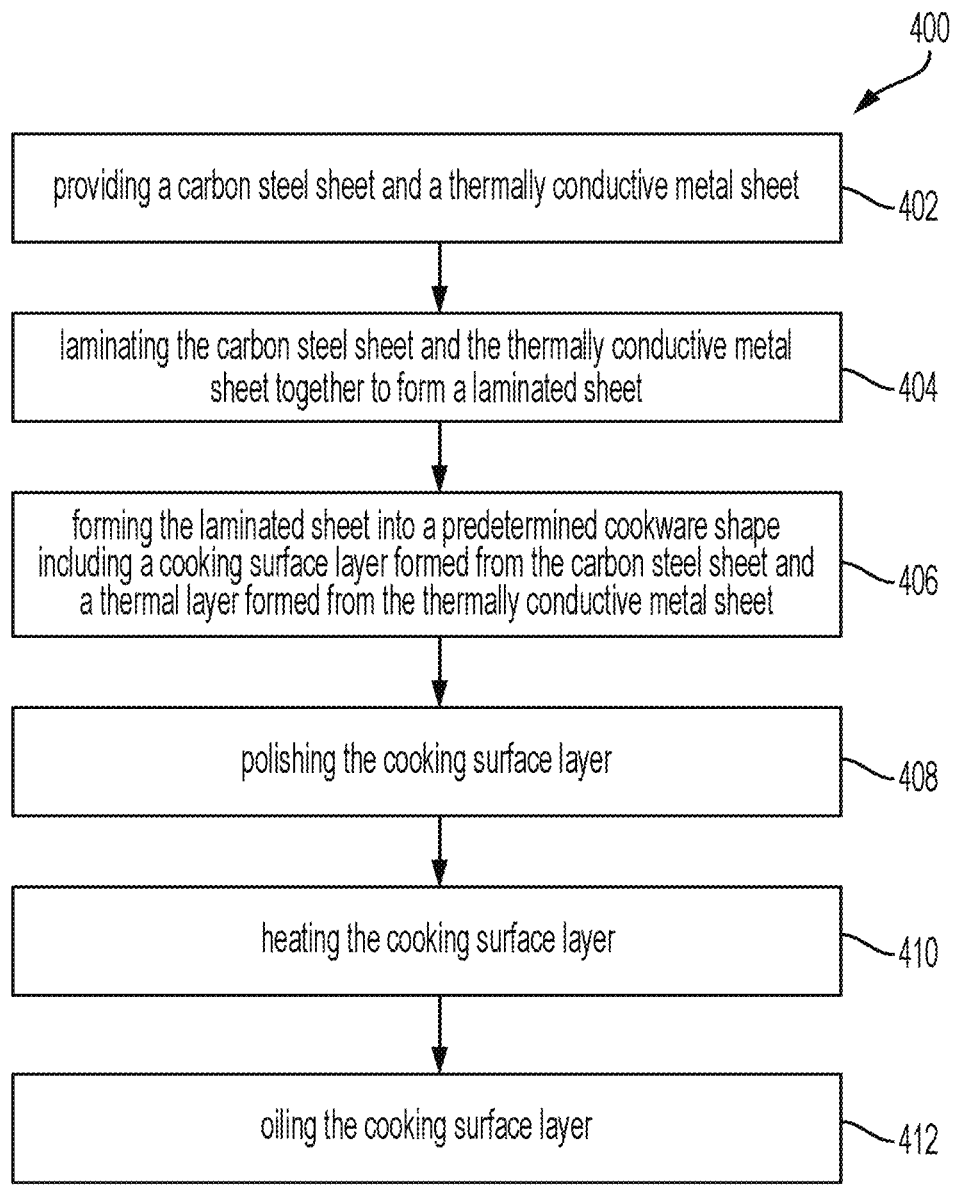
FIG. 4 is a flowchart diagram illustrating an exemplary implementation of a method of manufacturing the multi-ply cookware of FIG. 1.

As shown in FIG. 4, the present disclosure may also provide a method of manufacturing 400 the multi-ply cookware 100, the method of manufacturing 400 the multi-ply cookware 100 may include performing one or more steps including, but not limited to, providing the sheets 402, laminating the sheets together to form a laminated sheet 404, forming the laminated sheet into a predetermined cookware shape 406, polishing the cooking surface layer 408, heating the cooking surface layer 410, and oiling the cooking surface layer 412. Each of these steps, as well as additional steps, are discussed in more detail below.

The step of providing the sheets 402 may include the step of selecting the materials used for the sheets including selecting the type, number, and composition of layers that will form the body 102 of the multi-ply cookware 100 as well as whether the multi-ply cookware 100 will be fully or partially clad. The type of layers may include cooking surface layer 118, thermal layers 120, and protective layer 122 as discussed elsewhere herein. Generally, the body 102 of the multi-ply cookware 100 only includes one cooking surface layer 118 and, if a protective layer 122 is present, one protective layer 122. However, additional cooking surface layers 118 and protective layers 122 may be used. The body 102 of the multi-ply cookware 100 may also include one or more thermal layers 120 selected to give the multi-ply cookware 100 the desired thermal properties. For example, the body 102 of the multi-ply cookware 100 may include one, two, three, four, five, or six or more thermal layers 120. The composition of the cooking surface layer 118, one or more thermal layers 120, and protective layers 122 may be selected from the materials discussed above. Each of the one or more thermal layers 120 may have the same composition or a different composition.

The step of providing the sheets 402 may include the step of preparing the materials including preparing the materials being used to form the cooking surface layer 118, the one or more thermal layers 120, and, if present, the protective layer 122 into sheets of a desired thickness if the materials are not provided as sheets of the desired thickness. Ingots or sheets composed of a desired material may be used as the starting materials. In some embodiments, a carbon steel sheet, a thermally conductive metal sheet, which may be composed of, for example, aluminum or copper, and a durable, corrosion resistant sheet, which may be composed of, for example, stainless steel, may be used as the starting materials. The ingot or sheet may be reduced to a sheet of the desired thickness by rolling. The step of rolling may include hot rolling in which the ingot or sheet is heated to a temperature above the recrystallization temperature of the material forming the ingot or sheet and passed through a series of rolling mills to reduce the ingot or sheet to a sheet of the desired thickness. After hot rolling, the sheet may be cooled at a desired rate to imbue the sheet with desired strength and hardness properties.

The step of rolling may also include cold rolling the sheet instead of or in addition to hot rolling to further reduce the thickness the sheet and improve surface finish. Cold rolling may include passing the sheet through rollers at or near room temperature. In some implementations, the step of cold rolling may make the sheet more hard or brittle than desired. In such implementations, it may be desirable to perform an annealing step to restore the ductility of the sheet. The annealing step may include heating the sheet to a desired temperature and slowly cooling it to relieve internal stresses and improve the workability of the sheet. In some implementations, further rolling or final rolling may be necessary to achieve the desired exact thickness, surface finish, or mechanical properties for the sheet. Different sheets may be prepared using the same or different steps of preparing depending on the desired characteristics of the resulting sheet and the multi-ply cookware 100.

After the sheets are prepared to the desired thickness, the step of providing the sheets 402 may include the step of cleaning the surfaces of the sheets. The step of cleaning the surfaces of the sheets may include one or more steps of degreasing, pickling, and mechanical cleaning of the sheets. Degreasing may include using solvents such as acetone, trichloroethylene, or alkaline cleaning agents to break down oils, grease, and other components present on the surface of a sheet due to handling, storage, or previous processing. Pickling may include placing a sheet in a bath of acid such as sulfuric acid or hydrochloric acid to dissolve oxides, scales, or rust on the surface of the sheet. Oxide layers may be particularly likely to have formed on the surface of a sheet when the step of rolling includes hot rolling or when the sheet has undergone other heat treatments. Mechanical cleaning may include brushing and abrasive blasting (e.g., sand blasting or bead blasting) to remove surface impurities, scale, or roughness mechanically. Mechanical cleaning may not be appropriate for very thin sheets, such as, for example, sheets about 0.2 mm or less depending on the material of the sheet as damage to the sheet may occur. Different sheets may be cleaned using the same or different steps of cleaning depending on the desired characteristics of the resulting sheet and the multi-ply cookware 100.

The step of providing the sheets 402 may include the step of preparing the surfaces of the sheets to enhance bonding between sheets during lamination. Different surfaces of the same or different sheets may be prepared for lamination using the same or different steps of preparing the surface depending on the composition of the sheet, the composition of the sheet that it is to be bonded to, and the layer of the body 102 of the multi-ply cookware 100 that the sheet is intended to form. The step of preparing the surface of the sheets may include a step of surface roughening. Surface roughening may include mechanical methods of surface roughening such as abrasive blasting or wire brushing. Roughening the surface may increase the surface area for bonding and help the sheets fuse more effectively during the cladding process.

The step of preparing the surfaces of the sheets for lamination may also include surface activation. Surface activation may include acid etching of the surface of the sheet using acids such as hydrochloric acid, sulfuric acid, or nitric acid to lightly etch or roughen the surface of the sheet to improve bonding between sheets during lamination. Surface activation may also include conversion coating the surface of the sheets. Conversion coating is a chemical treatment that transforms the surface of the sheet into a thin, corrosion-resistant layer that improves adhesion of adjacent sheets during lamination. Types of conversion coatings may include chromate conversion coating, which may be used on aluminum sheets, and phosphate coating, which may be used on steel sheets. Surface activation may also include applying of silane coupling agents to the surface of the sheet. Silane coupling agents may bond to the surfaces of different sheets to improve adhesion between the surfaces. After chemical activation, the sheets may be rinsed with deionized water to remove any residual chemicals.

Moreover, the step of preparing the surfaces of the sheets for lamination may include oxide layer control. In some embodiments, it may be desirable to induce a small oxide layer on the surface of the sheets. Oxidation of the surface of a sheet may be performed using steps of controlled atmospheric oxidation, chemical oxidation, or electrochemical oxidation. In controlled atmospheric oxidation, a sheet is exposed to an oxygen-rich environment at elevated temperatures causing the formation of a thin, controlled oxide layer on the surface of the sheet. In chemical oxidation, a sheet is submerged in a chemical bath containing oxidation agents such as hydrogen peroxide, potassium permanganate, or nitric acid. In electrochemical oxidation, a sheet is submerged in an electrolytic bath and an electrical current may be applied to the sheet to form a controlled, porous oxide layer that can enhance bonding during lamination. The process of anodizing of aluminum is an example of an electrochemical oxidation process that may be used in the present disclosure.

After the step of providing the sheets 402 including any desired steps of cleaning or preparing the surface of the sheets, the sheets may be ready to undergo the step of laminating 404 the sheets together to form a laminated sheet. Lamination is the process of bonding different sheets of material together to create a single, cohesive laminated sheet having layers formed by the different sheets of material. Different lamination techniques may be used to form the body 102 of the multi-ply cookware 100 of the present disclosure. Example techniques include roll bonding and diffusion bonding. Roll bonding, which may also be referred to as roll lamination, may be performed by stacking the sheets and passing the sheets through one or more rollers under high pressure and temperature. The rolling process compresses the sheets together such that the sheets bond at a molecular level. Diffusion bonding, which may also be referred to as solid-state lamination, may be performed by pressing the sheets together under high pressure and temperature for an extended period. This process allows atoms from each sheet to diffuse into other sheets, creating a bond without melting the sheets. Solid-state lamination may produce a very strong bond between sheets and form a laminated sheet with no distinct boundary between the layers.

After the sheets are laminated together, the resulting laminated sheet can undergo the step of forming 406 the laminated sheet into a predetermined cookware shape. The step of forming 406 the laminated sheet into a predetermined cookware shape of the multi-ply cookware 100 may include the step of blanking. Blanking is the initial process of cutting the circular, elliptical, rectangular, or other shaped flat blanks, depending on the desired shape of the multi-ply cookware 100, from the laminated sheet. In some implementations, this may be done with a stamping press. The step of forming the laminated sheet into a predetermined cookware shape 406 may also include the step of deep drawing. Deep drawing involves placing the blank into a die and using a vertical press to stamp the flat blank into the die, which causes the blank to stretch and take the shape of the die. The step of forming the laminated sheet into a predetermined cookware shape 406 may include the step of spinning instead of or in addition to the step of deep drawing. Spinning involves rotating the partially formed multi-ply cookware 100 at high speeds using a lathe or other device while a roller tool presses against the flat blank or partially formed laminated sheet to refine the shape of the laminated sheet into the desired shape of the multi-ply cookware 100. The step of forming the laminated sheet into a predetermined cookware shape 406may further include the step of trimming. The step of trimming may include cutting off excess material at the edges of the multi-ply cookware 100 after the steps of deep drawing and/or spinning to achieve the final edge profile for the multi-ply cookware 100. The step of trimming may be performed using cutting tools or a trimming press.

Depending on the desired final shape and properties of the body 102 of the multi-ply cookware 100, the step of forming the laminated sheet into a predetermined cookware shape 406 may include steps of edge curling, annealing, and/or secondary forming. The step of edge curling or edge beading includes rolling the edge of the multi-ply cookware 100 to form a rounded lip, which strengthens the edge and improves durability. As discussed elsewhere herein, the step of annealing may include heating the body 102 of the multi-ply cookware 100 to a specific temperature and slowly cooling it to relieve internal stresses in the body 102 caused by the step of forming the laminated sheet into a predetermined cookware shape 406. The step of secondary forming may include, for example, attaching the handle 104 using rivets 106 or by welding the handle 104 to the body 102; forming a rim 112 or pour spout using precision forming tools; or forming the base 108 to have an upward bow (for example, making the interior surface of the base 108 concave and the exterior surface of the base 108 convex). Once the step of forming is complete, the body 102 of the multi-ply cookware 100 should be in its final shape.

After the step of forming the laminated sheet into a predetermined cookware shape 406, the multi-ply cookware 100 may undergo the step of surface finishing. The step of surface finishing may include the step of sanding. Sanding the surface of the multi-ply cookware 100 may include applying sandpaper or other abrasive materials to the surface of the multi-ply cookware 100 to remove scratches, rough spots, or other surface defects that may have occurred during manufacturing. Sanding may be performed in stages beginning with coarse abrasive materials to remove larger imperfections and ending with fine abrasive materials to produce a matte or satin finish. Sanding may be used to prepare the interior surface 114 or exterior surface 116 of the multi-ply cookware 100 for other surface finishing steps discussed herein.

The step of surface finishing may also include the step of polishing the cooking surface layer 408. The step of polishing the cooking surface layer 408 may include applying fine abrasive materials, polishing compounds, and buffing tools to the surface of the multi-ply cookware 100 to create a smooth, shiny, reflective surface on the multi-ply cookware 100. The step of polishing the cooking surface layer 408 may also include several stages beginning with relatively coarse abrasive materials to moving to relatively fine abrasive materials to produce a bright, even mirror-like finish. For example, the step of polishing 408 may include three stages of polishing using a coarse abrasive material, a moderately abrasive material, and a fine abrasive material. Polishing helps reduce the adhesion of food to the surface of the multi-ply cookware 100 during cleaning, makes the multi-ply cookware 100 easier to clean, and enhances the aesthetic appeal of the multi-ply cookware 100.

The step of surface finishing may also include the step of heating 410. The step of heating 410 may include heating the multi-ply cookware 100 to evaporate any residual moisture from the interior surface 114 and exterior surface 116 of the multi-ply cookware 100, which, in turn, may prevent rusting on the multi-ply cookware 100 in the short term following the manufacturing of the multi-ply cookware 100. In some embodiments, it may only be necessary to perform the step of heating 410 on the cooking surface layer 118. However, it is understood that such heating may result in incidental heating of the thermal layer 120 or protective layer 122. The step of heating 410 may be performed using, for example, a continuous-process oven (i.e., a conveyor oven) having an infrared heating element. The step of heating 410 may include heating the multi-layer cookware 100 to a temperature that is sufficiently low enough so as to not induce rapid oxidation on the interior 114 or exterior surface 116 of the multi-layer cookware and to allow for handling of the multi-layer cookware 100 while still quickly evaporating any residual moisture from the interior surface 114 and exterior surface 116 of the multi-ply cookware 100. For example, the step of heating may include heating the multi-layer cookware 100 to a temperature of about 65° C. to about 75° C. In another embodiment, the step of heating may include heating the multi-layer cookware 100 to a temperature of about 68° C. to about 72° C. For instance, the step of heating may include heating the multi-layer cookware 100 up to a temperature of about 70° C. In some embodiments, the step of heating may be performed after the steps of sanding and/or polishing and before the step of oiling.

The step of surface finishing may also include the step of oiling 412. The step of oiling 412 the cooking surface layer may involve applying a layer or coat of fat or oil to the surface of the multi-ply cookware 100 to prevent oxidation. In some implementations, the step of oiling 412 the cooking surface layer may be part of the step of seasoning, which may further include heating the fat or oil until it polymerizes to form a hard, low-stick surface on the surface of the multi-ply cookware 100.

The step of surface finishing may also include other finishing steps including but not limited to steps of brushing, electropolishing, passivation, anodizing, engraving, powder coating, bluing, and nitriding. The step of brushing may involve passing a brush or abrasive pad over the surface of the multi-ply cookware 100 to produce a series of fine, parallel lines on the multi-ply cookware 100 to produce a textured appearance. The step of electropolishing may include submerging the multi-ply cookware 100 in an electrolytic bath and passing an electric current through the multi-ply cookware 100 to remove a thin layer of metal and create a highly polished, smooth surface. The step of passivation may involve immersing the multi-ply cookware 100 in an acid bath using acids such as nitric acid or citric acid to remove free iron and other contaminants from the surface and to form a passive oxide layer. The step of engraving or etching may be used to create designs, logos, or measurement markings on the interior surface 114 or exterior surface 116 of the multi-ply cookware 100 and can be done using mechanical tools (engraving) or chemical processes (etching).

The step of powder coating may involve applying, in some implementations electrostatically applying, a dry powder to the multi-ply cookware 100 and then curing it at high temperature to form a hard, durable finish. Typically, the dry powder used in powder coating is composed of a polymer. The step of bluing may include applying a thin, blue-black oxide layer formed of magnetite ($Fe_3O_4$) on the interior surface 114 and/or exterior surface 116 of the multi-ply cookware 100. The step of bluing may be performed using hot bluing, which involves immersing the multi-ply cookware 100 in a heated alkaline salt solution, usually composed of sodium hydroxide, sodium nitrate, and water to allow the steel to react with the chemicals to form the protective blue-black oxide layer, or cold bluing, which involves applying the bluing solution to the multi-ply cookware 100 at room temperature.

The step of nitriding may include diffusing nitrogen into the interior surface 114 and/or exterior surface 116 of the multi-ply cookware 100. The step of nitriding may be performed using gas nitriding, which involves heating the multi-ply cookware 100 in a nitrogen-rich gas, such as ammonia, which breaks down and releases nitrogen atoms that diffuse into the interior surface 114 and/or exterior surface 116 of the multi-ply cookware 100; plasma ion nitriding, which involves utilizing plasma in a vacuum chamber to bombard the surface of the multi-ply cookware 100 with nitrogen ions that penetrate and harden the interior surface 114 and/or exterior surface 116 of the multi-ply cookware 100; and salt bath nitriding, which involves immersing the multi-ply cookware 100 in a molten salt bath containing nitrogen-bearing salts to allow nitrogen to diffuse into the interior surface 114 and/or exterior surface 116 of the multi-ply cookware 100.

In some implementations, the various finishing steps may only be performed on the interior surface 114 or exterior surface 116 of the multi-ply cookware 100 or may only be performed on layers of the body 102 having a particular composition. For example, in some implementations, the steps of polishing and seasoning may only be performed on the interior surface 114 of the multi-ply cookware 100. As another example, the step of powder coating may only be performed on the exterior surface 116 of the multi-ply cookware 100 in some implementations. As a further example, in some implementations, the steps of electropolishing and passivation may be performed on layers composed of stainless steel, and the step of anodization may be performed on layers composed of aluminum.

The method of manufacturing 400 the multi-ply cookware 100 may also include a step of packaging. In some embodiments, the step of packaging may include packaging the multi-ply cookware 100 using one or more of cardboard boxes such as corrugated cardboard boxes or folding cartons; foam inserts such as EPS, EVA, or EPE foam inserts; blister packaging; clamshell packaging; shrink wrapping; vacuum packaging; bag packaging; bubble wrap; air pillows; custom molded pulp; wood crates; display packaging such as shelf-ready packaging or open window or cutout boxes; labeling and wraps such as branded stickers or paper wraps or sleeves.

In some implementations, it may be desirable to perform two or more of the manufacturing steps within a desired time of one another. For example, the step of laminating the sheets together to form a laminated sheet 404 may require the sheets to be heated to a high temperature to allow for proper bonding between the sheets. However, heating some types of metal, such as carbon steel, to the temperatures required during lamination may cause oxidation to occur. To prevent excessive oxidation from occurring, it may be desirable to perform steps of polishing the cooking surface layer 408, oiling the cooking surface layer 410, and/or any other surface finishing steps performed on the interior surface 114 or exterior surface 116 of the multi-ply cookware 100 within about 120 minutes, about 90 minutes, about 60 minutes, about 45 minutes, or about 30 minutes of the step of laminating the sheets together to form a laminated sheet 404.

EXAMPLE

The multi-ply cookware 100 of the present disclosure is further illustrated by the following example. It should be understood that the example below is for illustrative purposes only. This example should not be construed as limiting the scope of the invention.

Figure 2:
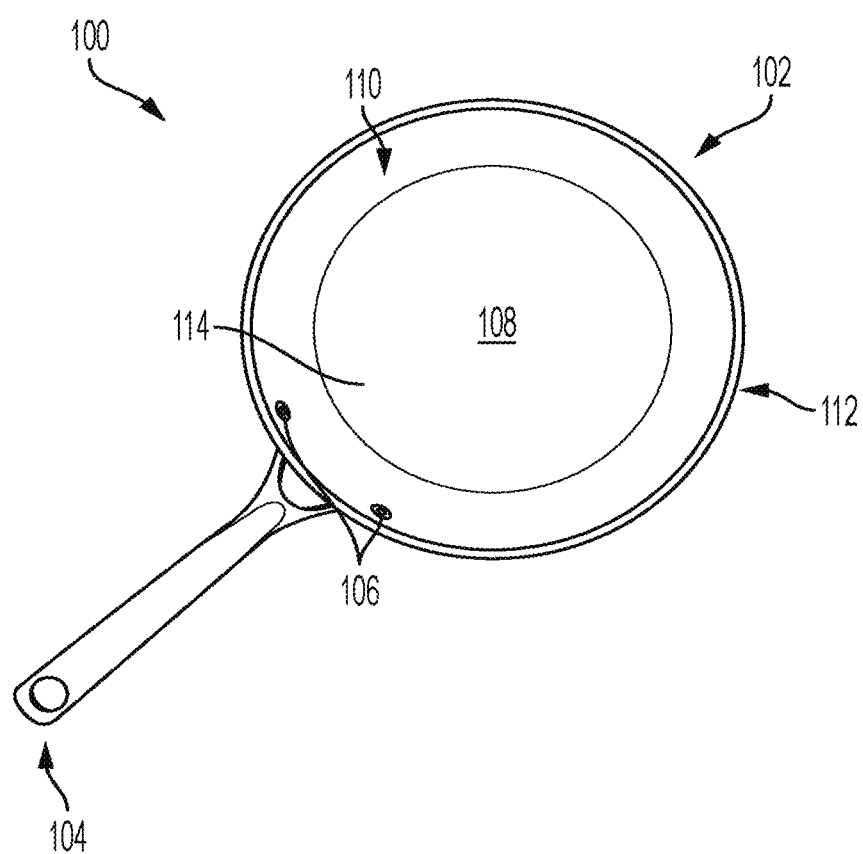
FIG. 2 is a top plan view of the multi-ply cookware of FIG. 1.
Figure 3:
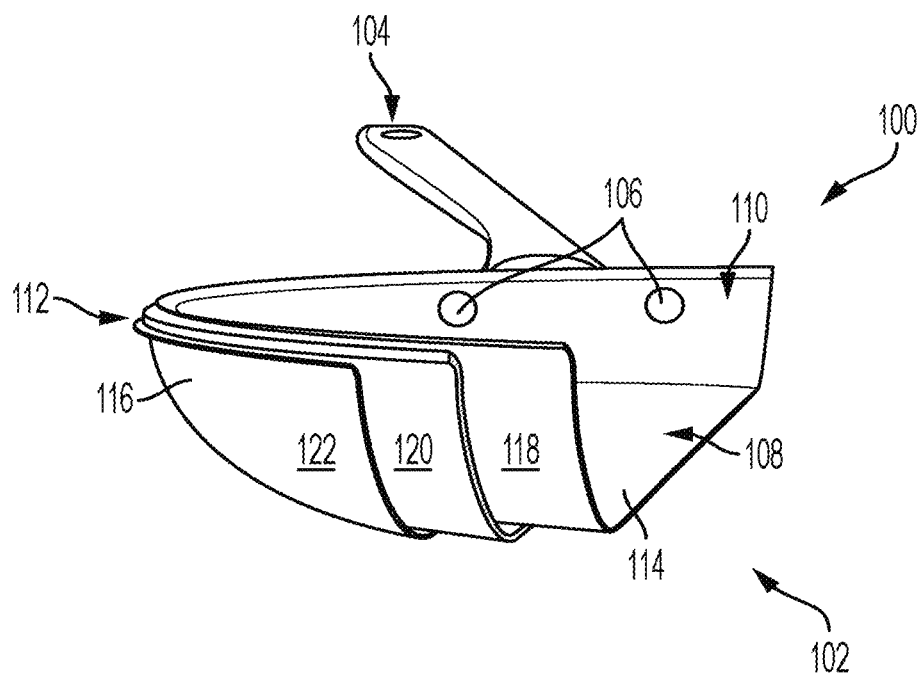
FIG. 3 is a cross sectional, elevation view of the multi-ply cookware of FIG. 1.

In one example, as shown in FIGS. 1-3, the multi-ply cookware 100 is a frying pan having a body 102 and a handle 104. The body 102 includes a cooking surface layer 118, a thermal layer 120 disposed below the cooking surface layer 118, and a protective layer 122 disposed below the thermal layer. The cooking surface layer 118 may be composed of DC03 carbon steel having a carbon content of 0.1% and may have a thickness of about 0.4 mm. The thermal layer 120 may be composed of 1050 aluminum and may have a thickness of about 2.0 mm. The protective layer 122 may be composed of 430 stainless steel and may have a thickness of about 0.4 mm thick. The handle 104 may be composed of hollow cast stainless steel and may secured to the body 102 of the multi-ply cookware 100 using rivets 106.

The multi-ply cookware 100 of this example is durable, corrosion resistant, and lightweight while also providing excellent heat distribution and a seasonable cooking surface as compared to prior art carbon steel cookware. Particularly, the carbon steel cooking surface layer 118 provides an interior surface 114 that can be seasoned such that polymerized oils and fats will adhere in a way that is durable, practical, and useful. In contrast to prior art carbon steel cookware, which uses a single, thick layer of carbon steel to increase strength and reduce warping but also significantly increases weight, the multi-ply cookware 100 of this example uses a thin layer of carbon steel to reduce the weight of the multi-ply cookware 100 while still having the benefit of a seasonable cooking surface. The aluminum thermal layer 120 conducts heat from the protective layer 122 to the cooking surface layer 118 and distributes heat across the cooking surface layer 118 to eliminate hot spots associated with prior art carbon steel cookware. The stainless steel protective layer 122 increases the strength of the multi-ply cookware 100 without significantly increasing the weight of the multi-ply cookware 100 and is corrosion resistant, which reduces the necessary maintenance in comparison to prior art steel pans.

The foregoing description illustrates and describes the processes, manufactures, compositions of matter, and other teachings of the present disclosure. Additionally, the disclosure shows and describes only certain embodiments of the processes, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, manufactures, compositions of matter, and other teachings of the present disclosure and to enable others skilled in the art to utilize the teachings of the present disclosure in such, or other, embodiments and with the various modifications required by the particular applications or uses. Accordingly, the processes, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A multi-ply cookware, comprising:
 a body comprising:
  a cooking surface layer formed from nitrided carbon steel, wherein the cooking surface layer forms an interior surface of the body;
  a thermal layer disposed below the cooking surface layer and formed from aluminum; and
  a protective layer disposed below the thermal layer and forming an exterior surface of the body opposite the interior surface; and
 a handle connected to the body,
 wherein the cooking surface layer, the thermal layer, and the protective layer are roll bonded together.

2. The multi-ply cookware of claim 1, wherein the protective layer is formed from carbon steel.

3. The multi-ply cookware of claim 1, wherein the protective layer is formed from carbon steel or stainless steel and the exterior surface is nitrided.

4. The multi-ply cookware of claim 1, wherein the carbon steel of the cooking surface layer has a carbon content of about 0.05% to about 2.0% carbon by weight.

5. The multi-ply cookware of claim 1, wherein the carbon steel of the cooking surface layer has a carbon content of about 0.05% to about 1.0% carbon by weight.

6. The multi-ply cookware of claim 1, wherein the cooking surface layer has a thickness of about 0.1 mm to about 3.0 mm.

7. The multi-ply cookware of claim 1, wherein the cooking surface layer has a thickness, $T_{CSL}$, and the carbon steel of the cooking surface layer has a carbon content, $CC_{CSL}$, and wherein $$0.03 \le \frac{T_{CSL}}{3 - CC_{CSL}} \le 1.05.$$

8. The multi-ply cookware of claim 1, wherein the thermal layer has a thickness of about 0.5 mm to about 5.0 mm.

9. The multi-ply cookware of claim 1, wherein the protective layer has a thickness of about 0.1 mm to about 3.0 mm.

10. The multi-ply cookware of claim 1, wherein the body comprises at least two thermal layers and at least one of the thermal layers is formed from stainless steel or carbon steel.

11. The multi-ply cookware of claim 1, wherein at least one or both of the interior surface and the exterior surface is blued.

12. The multi-ply cookware of claim 1, wherein at least one or both of the interior surface and the exterior surface is passivated.

13. A multi-ply cookware, comprising:
a body comprising:
  a cooking surface layer formed from carbon steel, wherein the cooking surface layer forms an interior surface of the body and the interior surface is nitrided,
  a thermal layer disposed below the cooking surface layer and formed from aluminum, and
  a protective layer disposed below the thermal layer and formed from carbon steel, stainless steel, or a combination thereof, wherein the protective layer forms an exterior surface of the body opposite the interior surface; and
a handle connected to the body,
wherein the cooking surface layer, the thermal layer, and the protective layer are roll bonded together.

14. The multi-ply cookware of claim 13, wherein the exterior surface is nitrided.

15. The multi-ply cookware of claim 13, wherein the carbon steel of the cooking surface layer has a carbon content of about 0.05% to about 1.0% carbon by weight.

16. The multi-ply cookware of claim 13, wherein the body further comprises a second thermal layer formed from stainless steel, carbon steel, or a combination thereof.

17. A method of manufacturing multi-ply cookware, comprising:
laminating a first carbon steel sheet, an aluminum metal sheet, and a second carbon steel sheet together to form a laminated sheet;
forming the laminated sheet into a predetermined cookware shape, wherein the first carbon steel sheet forms a cooking surface layer including an interior surface of the body, the aluminum metal sheet forms a thermal layer disposed below the cooking surface layer, and the second carbon steel sheet forms a protective layer disposed below the thermal layer, the protective layer including an exterior surface of the body; and
nitriding the interior surface of the cooking surface layer.

18. The method of claim 17, further comprising seasoning the interior surface.

19. The method of claim 18, wherein the interior surface is seasoned by applying a layer of fat or oil to the interior surface and heating the fat or oil until it polymerizes.

20. The method of claim 17, further comprising nitriding the exterior surface.

21. The method of claim 17, wherein the laminating step further comprises roll bonding the first carbon steel sheet, the aluminum metal sheet, and the second carbon steel sheet together.

* * * * *